US008322984B2

(12) United States Patent
Bosselmann

(10) Patent No.: US 8,322,984 B2
(45) Date of Patent: Dec. 4, 2012

(54) PRESSURE MEASUREMENT DEVICE AND METHOD FOR DETERMINING WIND FORCE AT WIND ENERGY INSTALLATIONS

(75) Inventor: Thomas Bosselmann, Marloffstein (DE)

(73) Assignee: Siemens Aktiengesellschaft, Munich (DE)

( * ) Notice: Subject to any disclaimer, the term of this patent is extended or adjusted under 35 U.S.C. 154(b) by 1283 days.

(21) Appl. No.: 12/059,813

(22) Filed: Mar. 31, 2008

(65) Prior Publication Data
US 2009/0016880 A1 Jan. 15, 2009

(30) Foreign Application Priority Data
Mar. 29, 2007 (DE) .......................... 10 2007 015 179

(51) Int. Cl.
*F03D 11/00* (2006.01)
(52) U.S. Cl. ......... 416/42; 416/61; 416/146 R; 416/232; 385/13; 73/715
(58) Field of Classification Search ................ 416/1, 42, 416/61, 146 R, 232; 415/26, 118; 73/715, 73/720, 729.1; 385/13
See application file for complete search history.

(56) References Cited

U.S. PATENT DOCUMENTS

| 4,798,089 | A | * | 1/1989 | Frick et al. ........................ 73/706 |
| 6,223,746 | B1 | | 5/2001 | Skinner |
| 6,246,048 | B1 | * | 6/2001 | Ramos et al. ............ 250/227.18 |
| 6,320,272 | B1 | | 11/2001 | Lading et al. |
| 6,490,931 | B1 | | 12/2002 | Fernald et al. |
| 6,626,043 | B1 | * | 9/2003 | Bailey et al. ..................... 73/705 |
| 6,768,825 | B2 | * | 7/2004 | Maron et al. ..................... 385/13 |
| 6,940,185 | B2 | * | 9/2005 | Andersen et al. ............... 290/44 |
| 7,840,102 | B2 | * | 11/2010 | Boyd .............................. 385/13 |
| 2002/0047275 | A1 | | 4/2002 | Wobben |
| 2007/0160338 | A1 | | 7/2007 | Mortensen et al. |
| 2008/0067814 | A1 | | 3/2008 | Volkmer |

FOREIGN PATENT DOCUMENTS
DE 2 137 188 2/1973
(Continued)

OTHER PUBLICATIONS

Li X. et al., "Embedded Fiber Bragg Grating Sensors in Polymer Structures Fabricated by Layered Manufacturing", Journal of Manufacturing Processes, vol. 5, No. 1, Jan. 2003, pp. 78-86.

(Continued)

*Primary Examiner* — Ninh H Nguyen
(74) *Attorney, Agent, or Firm* — Staas & Halsey LLP

(57) ABSTRACT

A rotor blade of a wind energy installation has a wall forming an outer shell, and at least one pressure measurement device arranged inside the rotor blade. The pressure measurement device includes a hollow body that is closed in a gastight fashion and has at least one pressure-dependent deformable diaphragm. At least one optical strain sensor is non-positively connected to each diaphragm. In a method using the pressure measurement device, the wind force is determined at wind energy installations by an evaluation unit which determines a comparison value indicating the difference between the pressure at the side of the outer shell facing the wind and the pressure at the side of the outer shell averted from the wind. A measured value for the wind force acting on the rotor blade is determined from the comparison value. The method can be used for optimized operation and/or protection of wind energy installations.

18 Claims, 4 Drawing Sheets

FOREIGN PATENT DOCUMENTS

| | | |
|---|---|---|
| DE | 30 00 678 A1 | 7/1981 |
| DE | 31 06 624 A1 | 9/1982 |
| DE | 197 31 918 A1 | 1/1999 |
| DE | 199 22 102 A1 | 12/2000 |
| DE | 102 19 664 A1 | 11/2003 |
| EP | 0 970 308 B1 | 5/2003 |
| GB | 1 356 783 | 6/1974 |
| WO | 2005/071382 A1 | 8/2005 |
| WO | 2006/039903 A1 | 4/2006 |

OTHER PUBLICATIONS

German Patent Office Action issued Dec. 4, 2007 in corresponding German Patent Application No. 10 2007 015 179.0-52.

German Office Action issued on Feb. 18, 2009 in corresponding German Patent Application 10 2007 015 179.0-52.

* cited by examiner

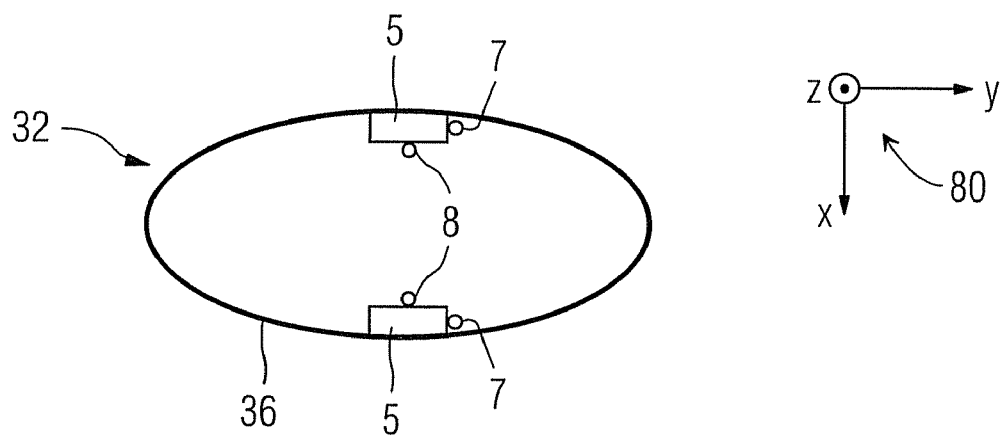
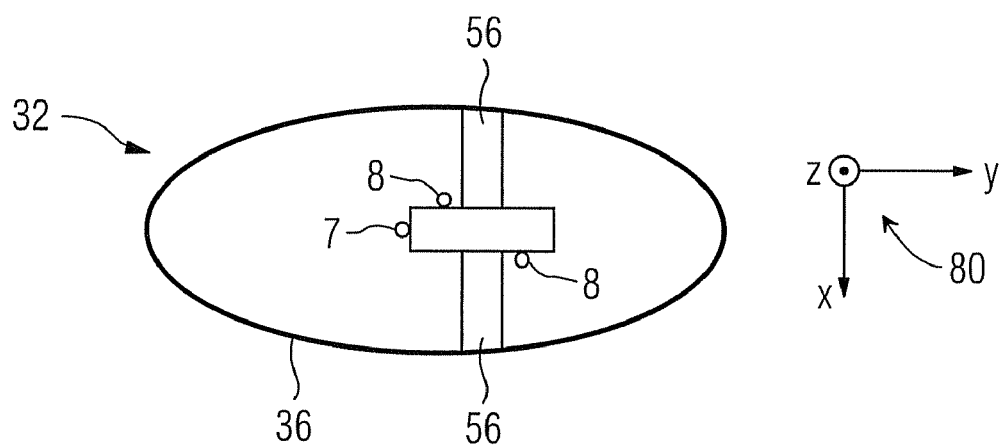

PRESSURE MEASUREMENT DEVICE AND METHOD FOR DETERMINING WIND FORCE AT WIND ENERGY INSTALLATIONS

CROSS REFERENCE TO RELATED APPLICATIONS

This application is based on and hereby claims priority to German Application No. 10 2007 015 179.0 filed on Mar. 29, 2007, the contents of which are hereby incorporated by reference.

BACKGROUND

Described below is a pressure measurement device for a rotor blade of a wind energy installation having a hollow body that is closed in a gastight fashion and has at least one pressure deformable diaphragm, a rotor blade of a wind energy installation having at least one pressure measurement device as described below, a wind energy installation having at least one rotor blade as described below, a method for determining a wind force acting on the rotor blade, as well as a use of the method.

Modern wind energy installations have a tower and a gondola, mounted rotatably on the tower, with a rotor. A high efficiency, a minimum sound emission, a low material use and a long service life are the criteria for the design and optimization of such wind energy installations. They are increasingly being produced in ever higher power classes. The aim is to achieve an ever higher efficiency and an increased output power referred to the spatial requirement of the installation. Particularly in the offshore sector, it is necessary to install relatively large wind energy installations because of the expensive provision of foundations. Such wind energy installations presently have rotor diameters of up to 130 m. The ever larger dimensions are attended by various problems in the design and operation of the installation. Firstly, the height gradation of the wind speed becomes noticeable because of the large rotor diameter. In this case, the individual rotor blades assigned to the rotor are partially exposed to strongly differing wind speeds. Consequently, each rotor blade operates with different efficiency in the case of a fixed rotor blade position (pitch). Secondly, a different wind load has a problematic effect on the individual rotor blades.

An excessively high wind load on an individual rotor blade can lead to intense sagging of the rotor blade, and thus to damage to it. Moreover, wind load of different intensity on the various rotor blades leads to a lateral torque on the shaft via which the rotor is connected in a rotatably supported fashion to a gearbox arranged in the tower of the wind energy installation. Such a torque loads the gearbox, and this can frequently lead to premature failure of gearbox parts.

Aneroid barometers can be used to measure air pressures. Such a barometer includes a hollow body, made of thin sheet metal, that resembles a box and is provided with a diaphragm, and in which a vacuum or underpressure prevails. The air pressure deforms the diaphragm. This deformation is transmitted via a mechanical system to a pointer such that the prevailing pressure can be read off from the pointer position.

EP 0 970 308 B1 specifies a wind energy installation having a wind speed measurement system. The wind speed measurement system is designed in this case as a laser anemometry system. Laser light is hereby emitted with the aid of a laser, and particles in the air are irradiated. The laser light is partially backscattered by the irradiated particles and detected by a detector. The speed of the particles can be inferred from analysis of the backscattered laser light. Since the speed of the particles corresponds to the wind speed, the wind speed in front of the wind turbine is determined in this way. Such a measurement is relatively complicated and can be carried out as a rule only by service staff by way of sampling.

SUMMARY

An aspect is to specify a pressure measurement device for a rotor blade of a wind energy installation, a rotor blade of a wind energy installation having at least one such pressure measurement device, a wind energy installation having at least one such rotor blade, a method for determining a wind force acting on the rotor blade, and a use of the method, all of which are durable and easy to handle.

Consequently, the pressure measurement device of the type initially specified is to be configured in such a way that at least one optical strain sensor is non-positively connected to the at least one diaphragm.

A measurement sensitivity that is higher by orders of magnitude can be achieved with the optical strain sensor. Even very small deformations of the diaphragm can thereby be measured. In addition, the installation of the optical strain sensor is very much simpler. Thus, the strain sensor can, for example, be bonded onto the diaphragm. A further advantage is that the optical strain sensor does not restrict the location where the pressure measurement device is used.

The pressure measurement device can also have the following features:

It can be advantageous when the pressure measurement device has a further diaphragm provided with a further strain sensor. It is favorable in this case for the two diaphragms to be arranged on mutually opposite sides of the hollow body. It is thereby possible to make a redundant measurement in order to enhance the measuring accuracy.

It can be advantageous when the strain sensor is designed as a fiber Bragg grating sensor that can be produced by inscribing a Bragg grating into an optical waveguide. The geometric dimension of such an advantageous fiber Bragg grating sensor is essentially determined by the optical waveguide used. The resulting extremely small space requirement of fiber Bragg grating sensors facilitates their mounting on the diaphragm of the pressure measurement device. Furthermore, it is advantageous that detection of measured variables does not require the light signal to be coupled into and out of the optical waveguide. The light is always guided inside the optical waveguide in the case of fiber Bragg grating sensors, and this enables measured variables to be detected in a particularly insensitive fashion.

It can be advantageous when at least one temperature sensor is provided for determining the temperature of the hollow body. Since the pressure in the hollow body depends on temperature, and therefore the pressure-dependent deformation of the diaphragm is likewise dependent on temperature, the temperature determination at the hollow body can be used to determine a correction value that can be used to compensate the temperature dependence of the diaphragm deformation.

The temperature sensor can advantageously be designed as a fiber Bragg grating sensor for the above named reasons.

The hollow body can advantageously be formed from an insulating material, in particular glass or polymethylmethacrylate. The coefficient of thermal expansion of such a material should in this case be as low as possible in order to minimize the influence of temperature on the diaphragm deformation. In addition, a hollow body of such design does not influence electric discharges such as occur, for example, as lightning during a thunderstorm.

The rotor blade may be part of a wind energy installation and include a wall forming an outer shell, and at least pressure measurement device, as described below, arranged inside the rotor blade.

The rotor blade gives rise to the advantages like those for the pressure measurement device explained above. In addition, the use of such a pressure measurement box avoids electrical leads into the rotor blade, for example. Since the pressure measurement device is integrated in the rotor blade below the outer shell, no aerodynamic distortions and noises emanating from the pressure measurement device occur.

The rotor blade can also have the following features:

It can be advantageous to provide at least one pressure line that is actively connected to a diaphragm of the pressure measurement device and is led to the rotor blade wall in order to pick up the pressure there. In order to measure the pressure at a specific site of the rotor blade outer shell, there is thus no need to position the hollow body of the pressure measurement device at this site. It suffices to lead the pressure line from this site to a diaphragm of the pressure measurement device, it being possible to position the hollow body at will in the rotor blade.

However, it can also be advantageous to provide two pressure lines that are each actively connected to a diaphragm of the pressure measurement device and are led to the rotor blade wall in such a way that the pressure at the side of the outer shell facing the wind can be picked up by one of the two pressure lines, and the pressure at the side of the outer shell averted from the wind can be picked up by the other pressure line. Alternatively, it is also advantageously possible to arrange two pressure measurement devices adjacent to the rotor blade wall in such a way that the pressure at the side of the outer shell facing the wind can be determined by one of the two pressure measurement devices, and the pressure at the side of the outer shell averted from the wind can be determined by the other pressure measurement device. In the case of both configurations, it is possible to determine from knowledge of the two pressures a difference pressure from which the force on the rotor blade can be determined.

It is advantageously possible to provide a number of pressure measurement devices distributed in the direction of extension of the longitudinal axis of the rotor blade. It is thereby possible to determine wind load differences between the rotor blade root and the rotor blade tip, and thus the load profile along the rotor blade longitudinal axis.

The wind energy installation described below has at least one rotor blade as described below. The advantages discussed above for the pressure measurement device and the rotor blade apply to the wind energy installation.

The wind energy installation can further have the following features:

It can be advantageous to provide a number of rotor blades that can be rotated independently of one another about their longitudinal axis. It is thereby possible to optimize every rotor blade individually for its force absorption.

It is advantageously possible in this case to provide each rotor blade with at least one pressure measurement device, and to provide a rotor blade control unit with the aid of which the respective rotary position of each rotor blade about its longitudinal axis can be controlled as a function of the wind force, determined by an evaluation unit, at the respective rotor blade. It is thereby possible to align each rotor blade by individual rotation about its longitudinal axis in such a way that the wind load on each rotor blade is uniform, an optimized wind force transmission is ensured, and that the corresponding rotor blade is relieved if required, for example in the event of overloading. This ensures effective utilization of the wind energy in conjunction with operational safety.

The method is used for determining the wind force acting on a rotor blade in which with the aid of an evaluation unit the pressure at the side of the outer shell facing the wind is compared with the pressure at the side of the outer shell averted from the wind, a comparison value is determined, and a measured value for the wind force acting on the rotor blade is determined from the comparison value.

The method may be used for the optimized operation and/or protection of the wind energy installation described below, in which the wind force at each individual rotor blade is determined and each rotor blade is aligned about its longitudinal axis as a function of the respective wind force.

BRIEF DESCRIPTION OF THE DRAWINGS

These and other aspects and advantages will become more apparent and more readily appreciated from the following description of exemplary embodiments, taken in conjunction with the accompanying drawings, not done to scale and with some features illustrated schematically, of which:

FIG. 3 is a cross section through a rotor blade in accordance with FIG. 2, having two pressure measurement devices on the rotor blade outer wall, FIG. 4 is a cross section through a rotor blade in accordance with FIG. 2, having one pressure measurement device and two pressure lines.

DETAILED DESCRIPTION OF THE PREFERRED EMBODIMENT

Figure 1:
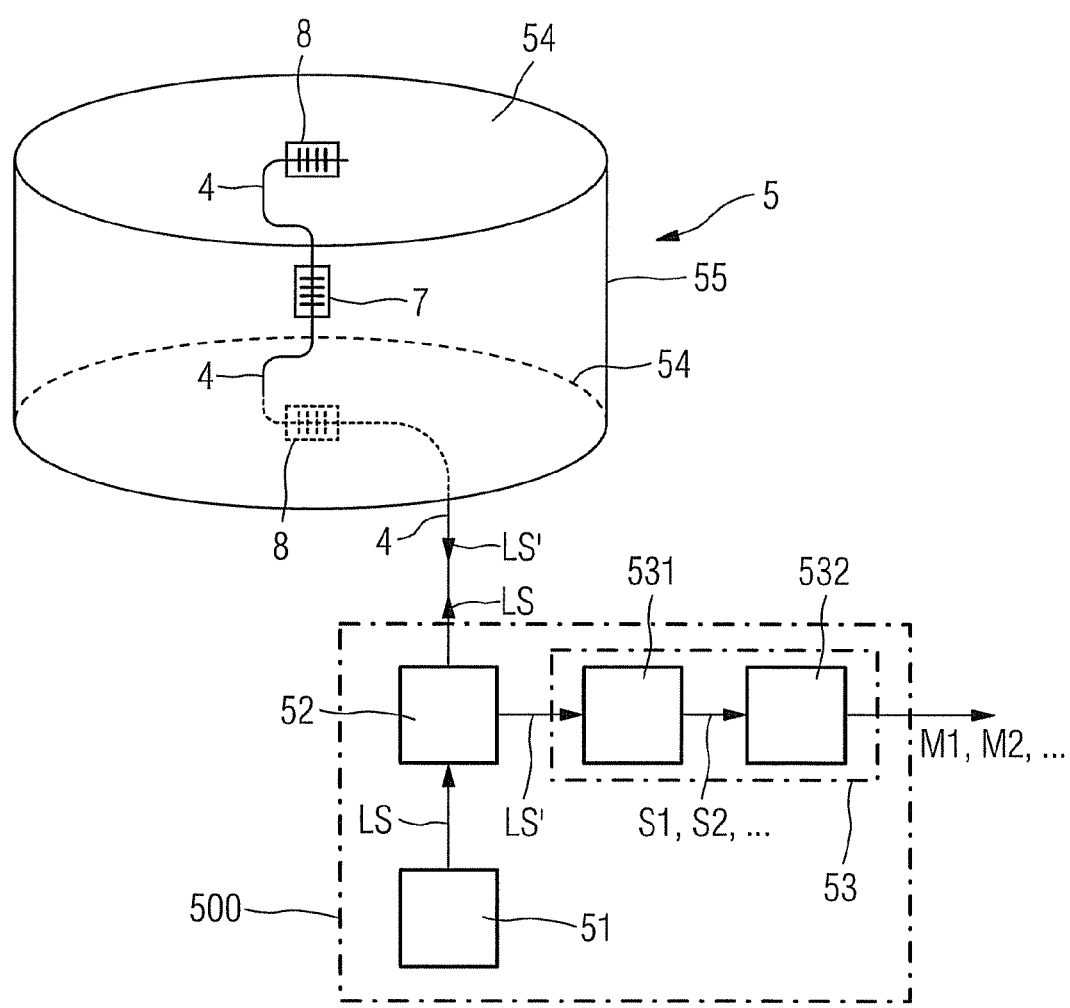
FIG. 1 is a block diagram of a pressure measurement device having two strain sensors and a temperature sensor.

Reference will now be made in detail to the preferred embodiments, examples of which are illustrated in the accompanying drawings, wherein like reference numerals refer to like elements throughout.

FIG. 1 shows a pressure measurement device 5 for a rotor blade 32 of a wind energy installation 10 having a hollow body 55 closed in a gastight fashion. The hollow body 55 is designed, for example, as a hollow cylinder. However, it can also be designed as a cube or cuboid. The top and the base of the hollow cylinder 55 are designed as deformable diaphragms 54 that, depending on the ratio of the gas pressures inside and outside the hollow body 55, are deformed as a function of pressure, for example, in a concave or convex fashion. Provided for the purpose of quantifying the deformation are strain sensors 8 that are respectively non-positively connected to the corresponding diaphragms 54. In order to be able to determine the temperature of the hollow body 55, the latter is provided with a temperature sensor 7. In FIG. 1, this temperature sensor 7 is fitted on the lateral surface of the hollow cylinder 55. The lateral surface is designed stably in such a way that it is not deformed in the event of a change in pressure. Particularly suitable as strain sensors 8 and temperature sensors 7 are, in particular, the schematically illustrated fiber Bragg grating sensors that can respectively have different specific centroid wavelengths—the so-called Bragg wavelengths. The fiber Bragg grating sensors 7, 8 are interrogated by a light signal LS that is generated by a broadband light source 51. The light signal LS is fed into the fiber Bragg grating sensors 7, 8 via a coupler 52 and one or more optical waveguides 4. In each fiber Bragg grating sensor 7, 8, a fraction of the light signal LS fed in with the respective centroid wavelength is retroreflected in each fiber Bragg grating sensor 7, 8 as partial reflex signal. By contrast, the remaining part of the light signal LS passes the relevant fiber Bragg grating sensor 7, 8 and, if appropriate, strikes the next fiber Bragg grating sensor 7, 8. There is then present at the coupler 52 a light signal LS' that has been reflected by the fiber Bragg grating sensors 7, 8 and is composed of the partial reflex light signals of the individual fiber Bragg grating sensors 7, 8. The centroid wavelengths of a number of fiber Bragg grating sensors 7, 8 of an optical waveguide 4 need not, however, necessarily be different when various fiber Bragg grating sensors 7, 8, for example a so-called "optical time domain reflectometer" is used to distinguish the response signals.

If the fiber Bragg grating sensors 8 experience a deformation, and the fiber Bragg grating sensor 7 experiences a temperature change, their centroid wavelength changes in accordance with the magnitude of the measured variable (deformation or temperature change) and there is therefore a change in the wavelength content (=the wavelength spectrum) of the partial reflex light signal reflected by the relevant sensor 7, 8. This variation in the wavelength content serves as a measure of the measured variable to be acquired.

However, a transmission operation is also conceivable (not shown in the figures). By contrast with the reflection operation, here the entire wavelength spectrum emitted by the light source 51 is examined for missing wavelength regions. The point is that these missing wavelength regions correspond to the respective centroid wavelengths of the individual sensors.

The light signal LS' originating from the fiber Bragg grating sensors 7, 8 and fed into the coupler 52 again is led from the coupler 52 to an evaluation unit 53. The latter includes, in particular, an optoelectronic transducer and an analog-to-digital converter, which is denoted overall by 531, as well as a digital signal processor 532. The optoelectronic transducer advantageously has a spectrally selective element for selecting the individual partial reflex light signals, for example in the form of a polychromator and an optoreceiver, which is also multipartite, if appropriate. Grating or diffraction spectrometers are conceivable for analyzing the light spectrum. Where use is made of an optical time domain reflectometer, a cost-effective edge filter, for example, is also sufficient. The coupler 52 can be dispensed with in transmission operation.

Here, the light signal LS is coupled in at one end of the optical waveguide 4 by the light source 51, and is detected at the other end of the optical waveguide 4 by an optoelectronic transducer. An analog-to-digital conversion takes place in the analog-to-digital converter following the optoelectronic conversion. The deformation and temperature measured values are therefore reproduced as digitized output signals S1, S2, . . . of the analog-to-digital converter and are fed to the digital signal processor 532. Here, measured values D1, D2, . . . for the pressure acting on the pressure measurement device 5 are calculated from the deformation values and the temperature measured values. The temperature measured values serve in this case to compensate the temperature dependence of the diaphragm deformation.

The light source 51, the coupler 52 and the evaluation unit 53 are combined in the transceiving unit 500, it being possible to consider the light source 51 and the coupler 52 as feed unit for feeding the light signal LS into the fiber Bragg grating sensors. In another exemplary embodiment (not shown), these subunits or parts thereof can be separated from one another, that is to say not designed as a common transceiving unit 500. Moreover, a purely analog evaluation is also possible, for example by a hard-wired electronic circuit. No analog-to-digital converter would be present, and the evaluation unit 53 would be implemented by analog technology.

Figure 2:
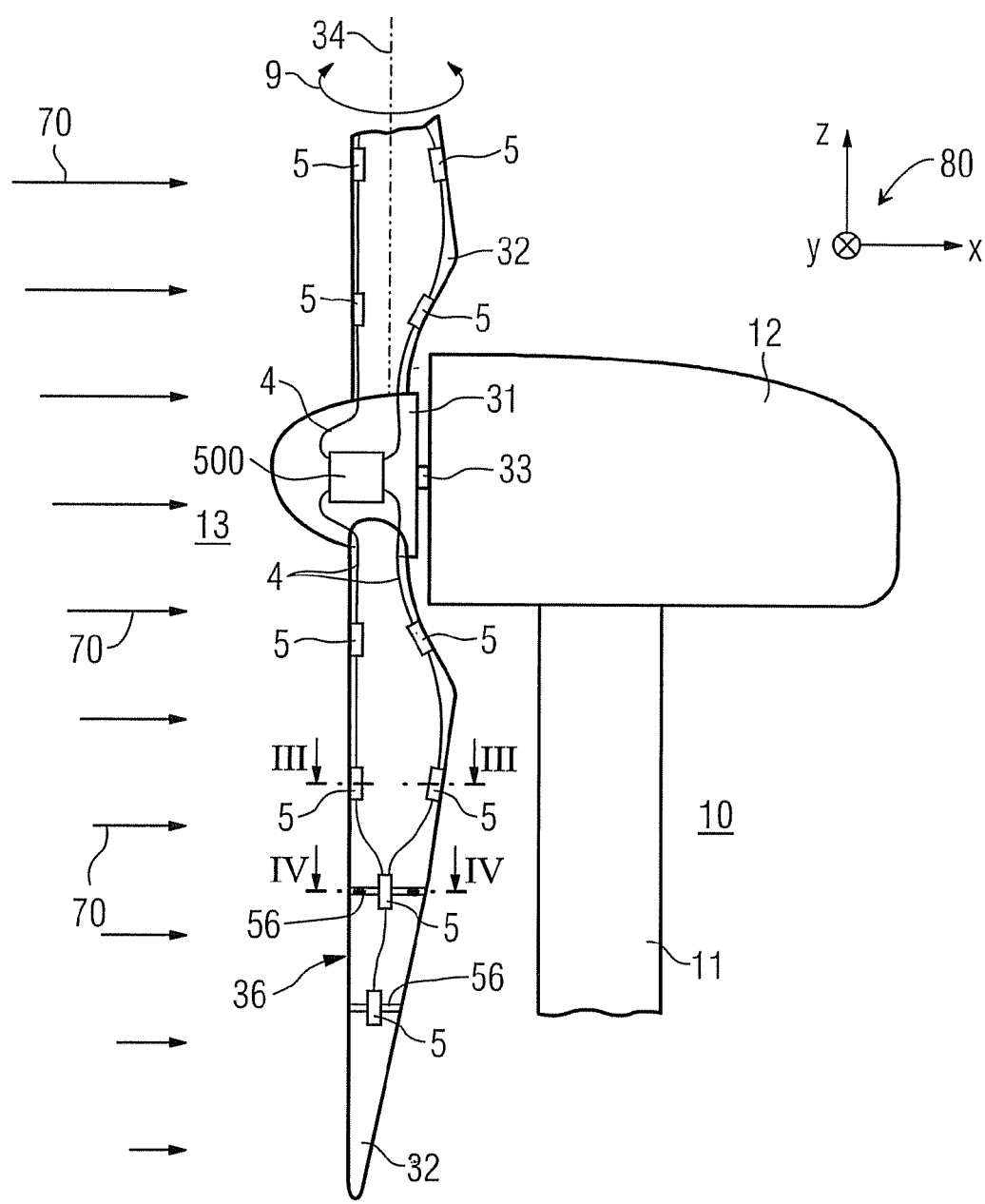
FIG. 2 is a side view of a wind energy installation having schematically illustrated pressure measurement devices for wind force determination.

FIG. 2 illustrates a wind energy installation 10 having a wind force measurement device. The wind energy installation 10 has a tower 11 and a gondola 12 rotatably supported on the tower 11. The axis of rotation of the gondola 12 coincides as a rule with the longitudinal axis of the tower 11. At the gondola 12, a rotatably supported rotor 13 is connected to the gondola 12 by a rotor shaft 33 arranged in a substantially horizontal fashion. In this case, the kinetic energy of rotation of the rotor 13 is passed on via the rotor shaft 33 to a generator arranged inside the gondola 12 for the purpose of generating energy. A gearbox is preferably arranged between rotor 13 and generator in order to be able to adapt the rotation speed of the rotor 13 to an optimum generator operation. For the sake of clarity, the gearbox and the generator are not illustrated in FIG. 2. The rotor 13 itself has a hub 31 and two or more rotor blades 32 fastened on the hub 31 and which can be rotated independently of one another about their longitudinal axes 34 (indicated by the arrow 9). The respective rotor blade 32 is rotated, for example, by a hydraulic drive or by a stepping motor (not illustrated in the figures).

In this exemplary embodiment, the wind force measurement device has a number of pressure measurement devices 5 arranged inside a rotor blade 32. Two different exemplary embodiments are possible for determining the wind force acting on the rotor blade 32. Both are indicated schematically in FIG. 2. In a first exemplary embodiment, two pressure measurement devices 5 are provided for determining the wind force, one of the two pressure measurement devices 5 being arranged on the side of the rotor blade wall 36, designed as outer shell, facing the wind, while the other pressure measurement device 5 is positioned on the side of the rotor blade wall 36 averted from the wind. Both pressure measurement devices 5 measure the prevailing pressure there directly. This exemplary embodiment is illustrated in FIG. 3 in a cross section III through the rotor blade 32. Only one pressure measurement device 5 is required to determine the wind force in the case of the second exemplary embodiment. However, the pressure measurement device is connected to two pressure lines 56, one of the two pressure lines 56 being led up to the side, facing the wind, of the rotor blade wall 36 designed as outer shell, while the other pressure line 56 is led up to the side of the rotor blade wall 36 averted from the wind. The two pressure lines 56 transmit the pressure prevailing at the rotor blade wall 36 to the pressure measurement device 5 for the purpose of determining the individual pressure values. This exemplary embodiment is illustrated in FIG. 4 in a cross section IV through the rotor blade 32.

It is shown, furthermore, in FIG. 2 that a number of pressure measurement devices 5 can be distributed along the entire rotor blade 32. It is thereby possible to determine differences in wind load and the load profile along the entire rotor blade 32 that are to be ascribed to a variable wind flow profile along the rotor blade. The wind flow is marked by arrows 70, the different length of the arrows 70 being intended to represent different flow speeds. In the example illustrated in FIG. 2, all the pressure measurement devices 5 are connected to a transceiving unit 500 that is arranged in the hub 31. The signal processor 532 of the evaluation unit 53 is used to compare the corresponding two pressure measured values D1 and D2, for example by subtraction, and to determine a comparison value ΔD (for example ΔD=D2−D1). This comparison value ΔD is then compared with reference comparison values $\Delta \text{Dref}_m$ (m=1, 2, ...) stored in a database on a storage medium. The reference comparison values $\Delta \text{Dref}_m$ have already been acquired under known, defined conditions. Consequently, upon coincidence of the comparison value ΔD with one of the reference comparison values $\Delta \text{Dref}_m$, a measured value M1, M2, ... is determined for the wind force at the location of the pressure recordings on the rotor blade 32.

If a number of light signals LS are fed successively in a regular fashion at fixed time intervals, particularly in a pulsed mode, at a sufficiently high repetition rate of 500 Hz to 10 kHz into the optical sensors 7, 8, a time sequence, determined by the repetition rate, of measured values M1, M2, ... can be determined for the wind force on the rotor blade 32 which enables the dynamics of the rotor blade 32 to be imaged. Thus, the deformation or deflection amplitude of a rotor blade 32 set swinging or vibrating can be determined in a time-resolved fashion.

Measured values M1, M2, ... generated by the transceiving unit 500 are, for example, transmitted by radio to a data acquisition unit (not illustrated in the figures). The data transmission can, however, also be performed in principle using electric lines or optically. Furthermore, the transceiving unit 500 and the data acquisition unit can also be designed as a joint unit.

If the magnitude of the comparison value AD exceeds a predetermined threshold value, the evaluation unit 53 transmits a warning signal directly to the data acquisition unit. Thus, a critical wind force can be determined with the transmission of the warning signal to the data acquisition unit. It is thereby possible to institute appropriate countermeasures and repair measures in good time.

Figure 5:
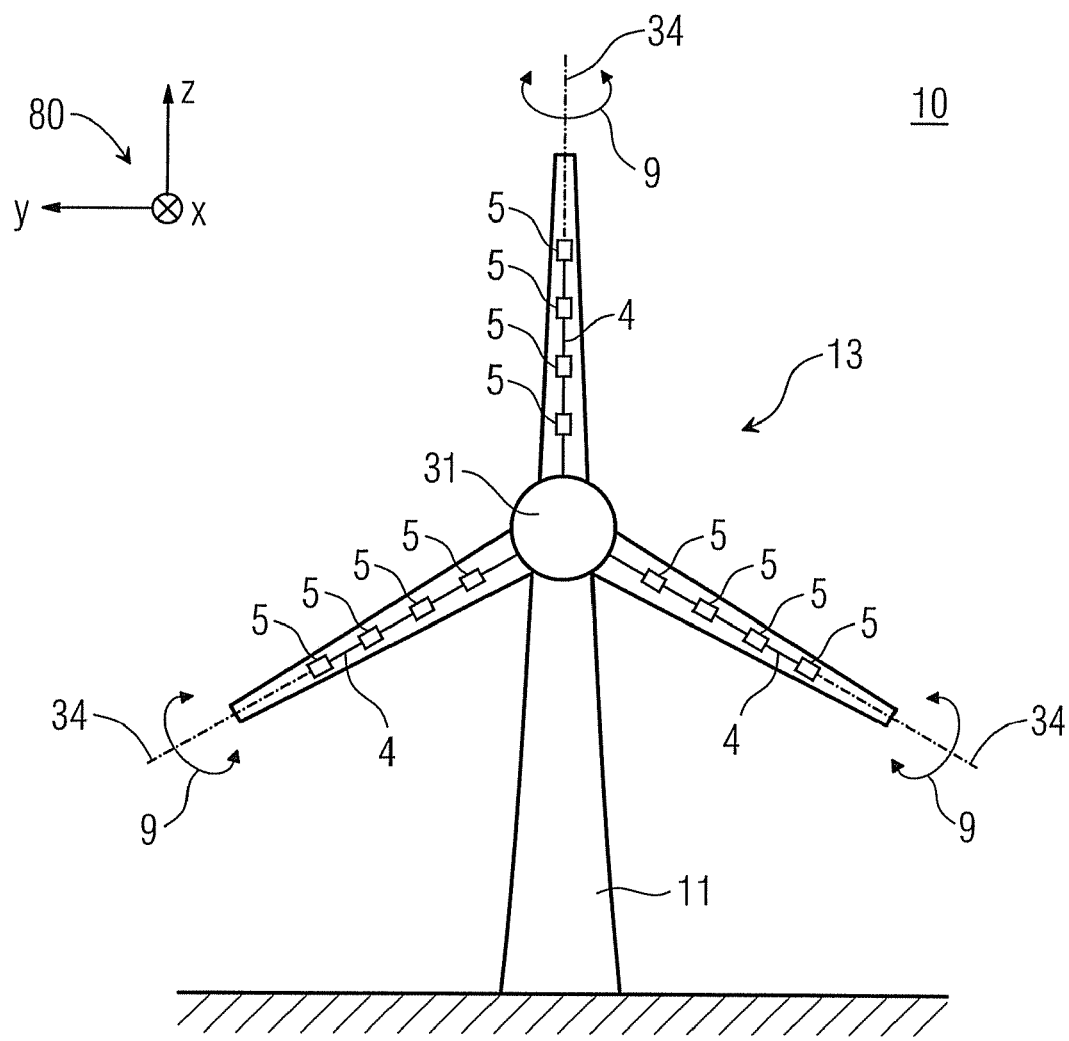
FIG. 5 is a simplified front view a wind energy installation having pressure measurement elements on each rotor blade.

FIG. 5 shows a wind energy installation 10 having a wind force measurement device, the rotor blades 32 thereof being provided in each case with numerous pressure measurement devices 5. The pressure measurement devices 5 are respectively distributed in this case along the entire rotor blade 32 in the direction of extension of the longitudinal axis 34. It is thereby possible at each instant from each longitudinal section along each rotor blade 32 to determine the wind force, and to adapt the rotor blades 32 individually to the prevailing wind strength conditions, for example by appropriate pitch about the respective longitudinal axis 34. This can preferably be performed by an active adaptive regulation of the rotor blade rotation.

A coordinating system 80 having x-, y- and z-axes is illustrated in each case in FIGS. 2 to 5 for the purpose of better understanding. For the sake of simplicity, and without any restrictions, it is assumed that the wind flow 70 to be examined flows onto the wind energy installation 10 in a fashion directed in the x-direction.

The system also includes permanent or removable storage, such as magnetic and optical discs, RAM, ROM, etc. on which instructions to perform the method and data structures used can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

What is claimed is:

1. A pressure measurement device for a rotor blade of a wind energy installation comprising:
    a hollow body closed in a gastight fashion having a non-deformable lateral surface; and
    at least two pressure deformable diaphragms, each provided with an optical strain sensor non-positively connected to a respective diaphragm.

2. The pressure measurement device as claimed in claim 1, wherein said at least two pressure deformable diaphragms are arranged on mutually opposite sides of said hollow body.

3. The pressure measurement device as claimed in claim 2, wherein each optical strain sensor is a fiber Bragg grating sensor.

4. The pressure measurement device as claimed in claim 3, further comprising at least one temperature sensor determining a temperature of said hollow body.

5. The pressure measurement device as claimed in claim 4, wherein the temperature sensor is placed on the non-deformable lateral surface of the hollow body.

6. The pressure measurement device as claimed in claim 4, wherein said temperature sensor is another fiber Bragg grating sensor.

7. The pressure measurement device as claimed in claim 6, wherein said hollow body is formed from an insulating material.

8. The pressure measurement device as claimed in claim 7, wherein said hollow body is formed from at least one of glass and polymethylmethacrylate.

9. A rotor blade of a wind energy installation, comprising:
    a wall forming an outer shell; and
    at least one pressure measurement device as claimed in claim 1, disposed inside said rotor blade.

10. The rotor blade as claimed in claim 9, further comprising at least one pressure line actively connected to at least one of the pressure deformable diaphragms of said pressure measurement device and having an end along said wall of said rotor blade to pick up pressure there.

11. The rotor blade as claimed in claim 9, wherein said at least one pressure line includes first and second pressure lines, each having a first end actively connected to a corresponding diaphragm of said pressure measurement device and a second end disposed along the wall forming the outer shell, the first pressure line picking up pressure at a first portion of the outer shell facing the wind and the second pressure line picking up the pressure at a second portion of the outer shell averted from the wind.

12. The rotor blade as claimed in claim 9, wherein said at least one pressure measurement device includes first and second pressure measurement devices arranged adjacent to said wall of the outer shell, the first pressure measurement device determining pressure at a first portion of the outer shell facing the wind and the second pressure measurement device determining the pressure at a second portion of the outer shell averted from the wind.

13. The rotor blade as claimed in claim 9, wherein said at least one pressure measurement device includes at least two pressure measurement devices distributed along a longitudinal axis of the rotor blade.

14. A wind energy installation having at least one rotor blade as claimed in claim 13.

15. The wind energy installation as claimed in claim 14, said at least one rotor blade includes at least two rotor blades independently rotatable about the longitudinal axis thereof.

16. The wind energy installation as claimed in claim 15, wherein each rotor blade is provided with at least one pressure measurement device, and
wherein said wind energy installation comprises:
an evaluation unit determining wind force at each rotor blade based on pressures determined by said at least two pressure measurement devices, and
a rotor blade control unit controlling a rotary position of each respective rotor blade about the longitudinal axis thereof as a function of the wind force, as determined by the evaluation unit, at the respective rotor blade.

17. A method for determining wind force acting on a rotor blade having outer shell, using an evaluation unit, by a method comprising:
measuring a first pressure at a first side of the outer shell facing a wind and a second pressure at a second side of the outer shell averted from the wind;
comparing pressure at the first side of the outer shell facing the wind with the second pressure at the second side of the outer shell averted from the wind to obtain a comparison value; and
determining a measured value for the wind force acting on the rotor blade from the comparison value.

18. A method for at least one of optimized operation and protection of a wind energy installation having a plurality of rotor blades, each having an outer shell, comprising:
measuring, for each rotor blade, a first pressure at a first side of the outer shell facing a wind and a second pressure at a second side of the outer shell averted from the wind;
comparing, for each rotor blade, pressure at the first side of the outer shell facing the wind with the second pressure at the second side of the outer shell averted from the wind to obtain a comparison value;
determining, for each rotor blade, a measured value for the wind force acting on each individual rotor blade from the comparison value; and
aligning each rotor blade about a longitudinal axis thereof as a function of the wind force determined for that rotor blade.

* * * * *